(12) United States Patent
Sloan

(10) Patent No.: US 10,502,525 B2
(45) Date of Patent: Dec. 10, 2019

(54) TACTICAL REFLECTOSCOPE

(75) Inventor: James Ray Sloan, Everett, WA (US)

(73) Assignee: James Ray Sloan

( * ) Notice: Subject to any disclaimer, the term of this patent is extended or adjusted under 35 U.S.C. 154(b) by 944 days.

(21) Appl. No.: 13/179,494

(22) Filed: Jul. 9, 2011

(65) Prior Publication Data
US 2012/0005938 A1    Jan. 12, 2012

Related U.S. Application Data

(60) Provisional application No. 61/399,228, filed on Jul. 9, 2010.

(51) Int. Cl.
*F41G 1/40* (2006.01)
*G02B 23/02* (2006.01)
*G02B 27/14* (2006.01)

(52) U.S. Cl.
CPC ............... *F41G 1/40* (2013.01); *G02B 23/02* (2013.01); *G02B 27/143* (2013.01)

(58) Field of Classification Search
CPC .................................... F41G 1/40; F41G 1/41
See application file for complete search history.

(56) References Cited

U.S. PATENT DOCUMENTS

| | | | | |
|---|---|---|---|---|
| 1,264,133 A * | 4/1918 | Morris | ...................... | F41G 1/06 42/118 |
| 2,685,814 A * | 8/1954 | Sloan | ...................... | F41G 1/473 356/17 |
| 6,643,969 B1 * | 11/2003 | Avizonis, Jr. | ............. | F41G 1/46 42/118 |
| 6,715,227 B2 * | 4/2004 | Swain | ...................... | F41G 1/41 42/118 |
| 7,552,557 B1 * | 6/2009 | Mabry | .................... | F41A 11/04 42/71.01 |
| 7,640,691 B2 * | 1/2010 | Karcher | .................... | F41G 1/40 359/399 |
| 7,896,508 B2 * | 3/2011 | Dyson | ...................... | F41G 1/00 359/543 |
| 2011/0000121 A1 * | 1/2011 | Uhl | .......................... | F41G 1/41 42/90 |

* cited by examiner

*Primary Examiner* — Reginald S Tillman, Jr.

(57) ABSTRACT

A three mirror-plane reflectoscope target acquisition accessory, with no moving parts, which mounts to the top, side or under any gun and many other apparatus to allow the user to: view, acquire and/or take action accurately from a cover and hidden position, around a corner, situating their person 90° to the side, above or below what is known as a typical firing position to the gun or host to which the tactical reflectoscope is affixed.

2 Claims, 28 Drawing Sheets

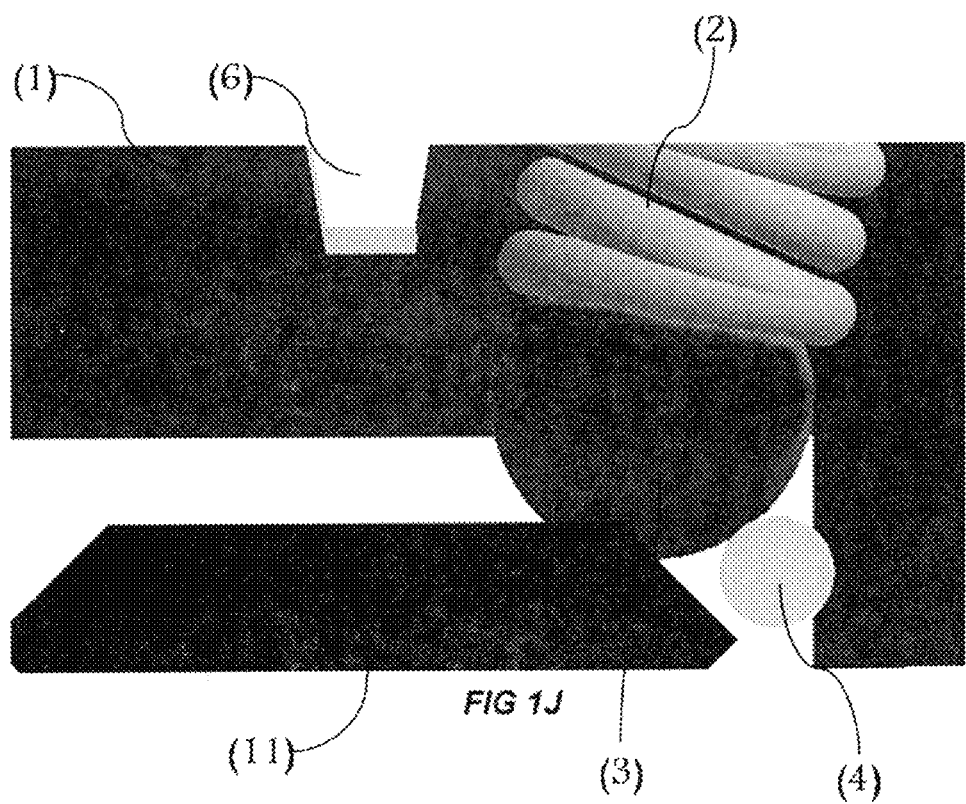

TACTICAL REFLECTOSCOPE

RELATED APPLICATIONS

The present application is a continuation application of U.S. provisional patent application, Ser. No. 61/399,228, filed Jul. 9, 2010, for TACTICAL TRIPLE MIRROR REFLECTOSCOPE FOR WEAPONRY, PRACTICAL MECHANICS AND SPORTS, by Floyd Willard Sloan, Sean Scott Sloan, James Ray Sloan, included by reference herein and for which benefit of the priority date is hereby claimed.

The present application is related to U.S. Pat. No. 7,552,557, issued Jul. 1, 2011, for PIVOTAL SHOULDER STOCK AND PISTOL COMBINATION, by James B. Mabry, included by reference herein.

The present application is related to United States patent number 20050241210, issued Jun. 19, 2010, for DUAL SIGHT SCOPE SYSTEM AND METHOD, by Karcher, Philip B, included by reference herein.

The present application is related to U.S. Pat. No. 2,304,045, issued Dec. 1, 1942, for BORE REFLECTOSCOPE, by Stanley, Kuhlman, Kolar, included by reference herein.

The present application is related to U.S. Pat. No. 3,863,354, issued Feb. 4, 1975, for MIRROR SIGHT FOR SMALL FIREARMS, by Karppinen, included by reference herein.

The present application is related to U.S. Pat. No. 1,651,661, issued May 24, 1926, for MACULAR REFLECTOSCOPE, by Arbruster, included by reference herein.

The present application is related to United States patent number 20030227697, issued Dec. 11, 2003, for GUN MIRROR, by Dyson, William E., included by reference herein.

The present application is related to United States patent number 20050132631, issued Jul. 1, 2005, for TACTICAL RIFLE SCOPE, by Atilla Bodo, included by reference herein.

The present application is related to U.S. Pat. No. 6,643,969, issued Nov. 11, 2003, for OPTICAL SIGHT APPARATUS FOR FIRING FROM COVER POSITIONS, by Petras V. Avizonis, included by reference herein.

The present application is related to U.S. Pat. No. 4,794,430, issued Dec. 27, 1988, for SOLID STATE RETICLE PROJECTOR FOR A WEAPON SIGHT, by Whittaker Thomas F, Wayne E. Isbell, Peter Sorensen III, Peter, included by reference herein.

The present application is a divisional application of United States patent application, serial number 20060005448, filed Jan. 12, 2006, for MIRROR SIGHT APPARATUS FOR GUNS, by Ballard, Marlin Daniel.

The present application is related to U.S. Pat. No. 2,381,801, issued Aug. 7, 1945, for REFLECTOSCOPE NOVELTY MIRROR, by H. L. Bloxom, included by reference herein.

FIELD OF THE INVENTION

The present invention relates to tactical mirror sights for guns and other delivery or acquisition apparatus and more particularly, to a device used for viewing the sight line of its hosts aim from a less exposed, atypical and therefore safer perspective, with the user situated 90° to either side of the gun or any delivery or acquisition apparatus, camera or fire hose to which it is connected.

BACKGROUND OF THE INVENTION

War, police action, home defense and military simulation type of games such as: paintball, laser tag and airsoft are more prevalent today than ever.

The need for tools to afford any advantage to the soldier, police officer, home owner and military simulation player are in demand.

The life-saving importance of such an invention as a tactical reflectoscope is evident in countless scenarios including;

A situation where a homeowner is startled awake to the sounds of a break-in, grabs his shotgun and quietly slides up to the doorway that leads to a perpendicular, long hallway.

Hearing noises from both directions, left and right down the hallway, the homeowner, terrified to look around the corner and risk being seen or attacked, could use the mirrors on the tactical reflectoscope that are positioned at 45° between the aim of his gun and the side of his gun. A tactical reflectoscope on his shotgun would allow the homeowner to swing his gun around a corner and see what is happening and warn an intruder and even fire his gun without exposing his head directly in-line with the danger. When the front sight of a gun or a laser target dot is seen through the mirrors on a tactical reflectoscope, it creates a triangulation that ensures accurate aim.

It is important to understand that the tactical reflectoscope will also allow the home owner to turn his gun 180° and see around the other corner in the same fashion with the same effectiveness, without having to re-position the tactical mirror sight to accommodate viewing from the opposite side of the gun.

As with any device, the fewer moving parts that are used to function, the less chance of failure. In close quarter combat situations, the tactical reflectoscope provides the advantage of permanently positioned mirrors and not only offer a lower potential of failure in itself, but also in the midst of the stressed nature of any life threatening circumstance, functions in a way that is used naturally, without fumbling by having to re-position a mirror or the entire scope itself. Muscle memory in familiarizing oneself with their firearm is an important aspect in use and optimal preparedness. The tactical reflectoscope remains in the exact same position every time it is used whereas, if there is the slightest change in position while aiming due to using a mirror sight that requires re-positioning, potentially compromises accuracy. Cited tactical mirror sights also either have to be moved or removed to aim using the sights on a gun from a traditional configuration, or employ a prism to be able to use the guns sights or any connected optical accessory which adds a level of complexity to the quality of integration between other rail accessories and use. The tactical reflectoscope has a void cut through it's center to enable use with other sights or optical accessories in conjunction with the tactical reflectoscope. The tactical reflectoscope is angled downward front to back, so it is shorter in the rear end to enable close placement of other optical scopes, flashlights and devices from behind.

The third mirror on the top of the tactical reflectoscope allows for use more like a periscope to see over, under, or around objects.

The laser and or flashlight module that can be added to the tactical reflectoscope is used to increase accuracy. The laser/flashlight module provides an all-in-one solution to preserve rail space or weight and because it's using the tactical reflectoscope to connect to the gun or host device, the installation and removal is as convenient.

The ball-detent option used on the tactical reflectoscope allows for instant off-and-on installation as well as instant zeroing, which means there is no need to worry about having to re-adjust after removal of the tactical reflectoscope and it also provides the added convenience of not having to worry about dropping and losing screws or clamps when replacing, as is the case with other rail mounted accessories. The ball-detent connection is also quiet for covert operation.

The set-screw connection used on the reflectoscope is a more permanent installation, but in contrast to other means by which rail accessories are connected, is a simple hex driven, set-screw that remains in the body of the tactical reflectoscope with removal and this connection is also quiet for covert operation.

The tension groove clip attachment is a spring steel plate that uses friction and a male bent groove connection to hold the reflectoscope or any accessory in place and particularly the plastic or lighter versions of the tactical reflectoscope or any accessory, and like the ball-detent connection has no parts like the typical clamps and screws to lose or adjustments to make when re-installing and is also quiet for covert operation.

The side tension connecting bar connection is a formed bar that pushes through the side wall of the reflectoscope and in-between the grooves on the Picatinny or Weaver rail and attaches to a catch in the opposite side of the body of the tactical reflectoscope and is also quiet for covert operation.

U.S. Pat. No. 7,552,557 is widely known as the Cornershot. A pivoting frame that holds a gun at one end has a hinge in the middle of its body and a traditional butt stock at the other end.

A camera on the front, pivoting end, sends the view of where the gun is aiming to a LCD screen or monitor located behind the hinge, around a corner.

U.S. Pat. No. 20050241210 is a scope made to be used from a traditional stance, behind a gun and to be able to see through the same scope from one side of the gun using a complex formation of prisms, mirrors and glass with an eyepiece that is positioned for each use, including re-positioning the device to be able to see from either side of the firearm.

U.S. Pat. No. 2,304,045 is bore reflectoscope comprised of a mirror system situated between the user and the sidewall of a pipe or bore for inspection.

U.S. Pat. No. 3,863,354 is a mirror sight that is comprised of a casing and mirrors that are moved into position to be used from near the side of a weapon.

U.S. Pat. No. 1,651,661 is a macular reflectoscope and in part, a mirror used to reflect light from a test character into a patients eyes.

U.S. Pat No. 20030227697 is a convex gun mirror.

U.S. Patent 20050132631 is a weapon scope for use on a firearm from a cover position comprised of a set of mirrors that can be used from a traditional stance form of aiming as well as an aspect from the side of the firearm and is moved into position for use.

U.S. Pat. No. 6,643,969 is an add-on eyepiece that is connected to an already installed scope and is field switched, changing the angle of view to the side, for use from behind cover.

U.S. Pat. No. 4,794,430 utilizes mirrors as well as light detecting chips for combat sighting from positions of cover or increased safety.

U.S. Pat No. 20060005448 is a single mirror connected to a gun and turned to the position needed to utilize.

U.S. Pat. No. 2,381,801 is a reflectoscope novelty toy mirror

The May, 2010 issue of SWAT magazine article features a device with a similar function as offered in this instance, made by Aimpoint called the CEU which allows the user to see around corners etc. This is an add-on to their existing scope and is projecting the image through another scope with some mirrors to see through the scope while standing to the side and is re-positioned for each use.

Other cited and otherwise known embodiments of tools used for and the basic concept of shooting around corners rely on moving a mirror, repositioning an eyepiece, or repositioning the whole device to accomplish seeing down the sight line to the intended target, when used from more than one side relative to the gun, acquisition or delivery system and the device that is reflecting the image. So, while previous embodiments and concepts provide the same results as this invention from one aspect or side of a gun, they are limited in that they can only be used from that side or approach to the gun to which they are attached, leaving the user to have to physically reposition the device or the entire gun. The one-sided nature of other devices and the need for repositioning in order to be utilized spends precious time and what could be the difference between life or death.

Any device that utilizes prisms is prone to condensation like any scope made of glass or plastic, but a prism system with its multiple surfaces, is more difficult to access in order to wipe off condensation and dirt and due to the fact that a prism is viewed 'through', means there are at least two surfaces that would need to be cleaned or cleared.

In a combat situation, it is not uncommon for a weapon and accessories to get dirty or muddy, a prism system would be difficult to access to clean, especially in the field.

A prism introduced into the line of sight would need to be tuned or focused to the other specific scopes or optical devices being used on the same firearm to ensure accuracy, especially from the traditional aspect and position that a firearm will be fired from the majority of the time.

A one side at a time view with prism solution doesn't allow light to pass through from a flashlight with much efficiency and because a flashlight cannot be positioned in front of the sight, it would have to be raised or placed below or to the side of the firearm.

Having nothing in the sight line of the sights or scopes is preferable.

A camera and monitor system used to see around corners on a firearm is subject to loss of battery power as well as failure of any electronic device if there is an electromagnetic pulse weapon or any other atomic or sub-atomic similar weapon(s) that interfere by means of alpha, gamma rays or electromagnetic impulses.

A camera and monitor system is relatively expensive, especially for the paintball or airsoft user.

As is well known in engineering and manufacturing, the less moving parts in a design, the less the possibility for failure. The typical environments in which this reflectoscope is used are battle zones, war, home defense, life saving, protection and other very serious situations which any tool that is being relied upon must perform with the greatest reliability.

The articles used in these situations should be solid, simple, easy to use, reliable and logical. A simple mirror on a stick that has to be turned correctly to use in a stressful situation is unreasonable. The mirror on a stick idea is also prone to breakage and has to be placed in a down position to see through to a guns iron sights or scope to be used in a natural firing position. None of the cited devices allow a user to see the sight line of a gun without obstruction of some sort while in a position of function. None of the cited devices are able to fire from both sides of a gun without repositioning the said device and none that allow for a third integrated view (as in this inventions third mirror perspective) of the environment.

In the case of wartime journalist camera operation, shooting from around the corner using a camera's eyepiece or screen can be difficult or too small for safe operation, a reflectoscope provides an additional and safer solution and approach.

In the case of a pool stick, the reflectoscope is used to access difficult shots for which no other solution discovered.

In the case of the paintball and airsoft gun user, a plastic reflectoscope offered in addition to an aluminum reflectoscope gives an economical and affordable advantage to the user and will most likely be more utilized than in any other application with an emphasis on aesthetics not found in most gun accessories.

As indicated, the other devices found that accomplish at least some of the functions of this reflectoscope are affected by extreme heat, cold, mud, dirt, sand, water and shock as well as electromagnetic pulses, respectively.

As this reflectoscope is one solid piece of material with mirrors surrounded by a protective lip in a pocket and no moving parts, the drawbacks associated with other cited inventions and similar devices are of little consideration with regard to how the reflectoscope responds in the same conditions. The tactical reflectoscope in use faces similar challenges as it's counterparts but has a time recovery factor that is superior due to its simple design. For example mud can be simply wiped off of the single surface of the mirrors and if the mirrors take a direct ballistic hit, they can be replaced easily in the field.

A larger version of the reflectoscope can be used by firefighters and affixed to the end or nozzle of their hose allowing them to see where to place the retardant while staying out of undue heat and danger or using a viewing port in a shield as is done presently.

The shape and material of this reflectoscope also makes it an alternative form of a striking weapon if the gun cannot be used to fire. The striking weapon aspect is especially evident when used in the upside down position on a pistol.

Other known gun accessories require cumbersome provisions in order to connect to the receiver of a gun or to a rail system and in most cases require tools and sometimes two people.

The reflectoscope with the detent-ball friction connection option as well as the two tension bar connection options allows for instant installation and removal by simply applying steady gentle force to the unit on or off of the rail by hand, on smaller caliber weapons, airsoft and paintball guns.

The reflectoscope rail acceptance groove wraps around the sides and under a Picatinny or Weaver rail allowing a brass or plastic tipped set-screw to connect by directing pressure toward the rail from above as well as in the groove of a rail preventing front to back movement in a unique and more permanent fashion when being used on a larger caliber weapon or shotgun, or if a more permanent installation is desired.

SUMMARY OF THE INVENTION

In accordance with the present invention, there is provided a three mirror-plane tactical reflectoscope which mounts to the top, side or under any gun and many other host apparatus, allowing the user to: view, acquire and/or take action from a covered and hidden position to the side of the firearm or host using mirrors attached to it's body, with no moving parts.

It would be advantageous to provide a tactical reflectoscope to help a user see and fire from a safe position set 90° to the side, around a corner, out of the direct path of the firing line.

It would also be advantageous to provide a tactical reflectoscope to help a user see and fire from a safe position from either side of the gun without making any adjustments to the device or mirrors.

It would also be advantageous to provide a tactical reflectoscope to help a user see from a safe position while holding the gun at an angle that would permit the use of the top optional mirror surface and, for instance, see what is behind him or out from a trench or hole.

It would also be advantageous to provide a tactical reflectoscope with no parts that need to move in order to function.

It would further be advantageous to provide a reflectoscope that is always engaged and ready for use without having to turn on some form of power or become useless by electromagnetic pulses and dead batteries.

It would further be advantageous to provide a reflectoscope that attaches to the Picatinny/Weaver rail typically found on or available for most firearms.

It would further be advantageous to provide a reflectoscope that attaches to the Picatinny/Weaver rail typically found on pistols.

It would further be advantageous to provide a reflectoscope that attaches to the receiver of a gun directly.

It would be further advantageous to provide a tactical reflectoscope that attaches to its hosts in several different ways as in a set-screw, ball-detent, tension spring systems and the like.

It would be further advantageous to provide a tactical reflectoscope that is made of a solid material for lasting endurance against weather, salt, water, magnetic disturbance, dirt, mud, chemicals, shock, abuse and battle.

It would be further advantageous to provide a tactical reflectoscope with lipped mirror pockets that protect the mirrors.

It would be further advantageous to provide a tactical reflectoscope that utilizes abrasion resistant mirror surfaces for lasting endurance.

It would also be advantageous to provide a tactical reflectoscope that a user could see through to their iron sights or allow the light from their attached laser, flashlight or scope to pass without making adjustments to the reflectoscope itself or being in the way or depending on the quality of a prism to be compatible with scopes and optics used in the traditional aiming of a firearm.

It would be further advantageous to provide a tactical reflectoscope made in such a solid or quality modular fashion or the like to prevent noise from moving parts, as is necessary in combat situations.

It would be further advantageous to provide a tactical reflectoscope made in such a solid or quality modular fashion to be used itself as a striking weapon.

It would be further advantageous to provide a tactical reflectoscope with an integrated laser or flashlight or the means of attaching a flashlight or laser for accuracy and convenience

BRIEF DESCRIPTION OF THE DRAWINGS

A complete understanding of the present invention may be obtained by reference to the accompanying drawings, when considered in conjunction with the subsequent, detailed description, in which:

FIG. 1J is a section view of a spring forcing ball into rail groove as well as the detent-ball retaining dowel holding the detent-ball in the ball hole, allowing enough of the ball to protrude to be effective holding the reflectoscope on to the rail and keeping the reflectoscope from sliding forward and back in use;

For purposes of clarity and brevity, like elements and components will bear the same designations and numbering throughout the Figures.

DESCRIPTION OF THE PREFERRED EMBODIMENT

Figure 1A:
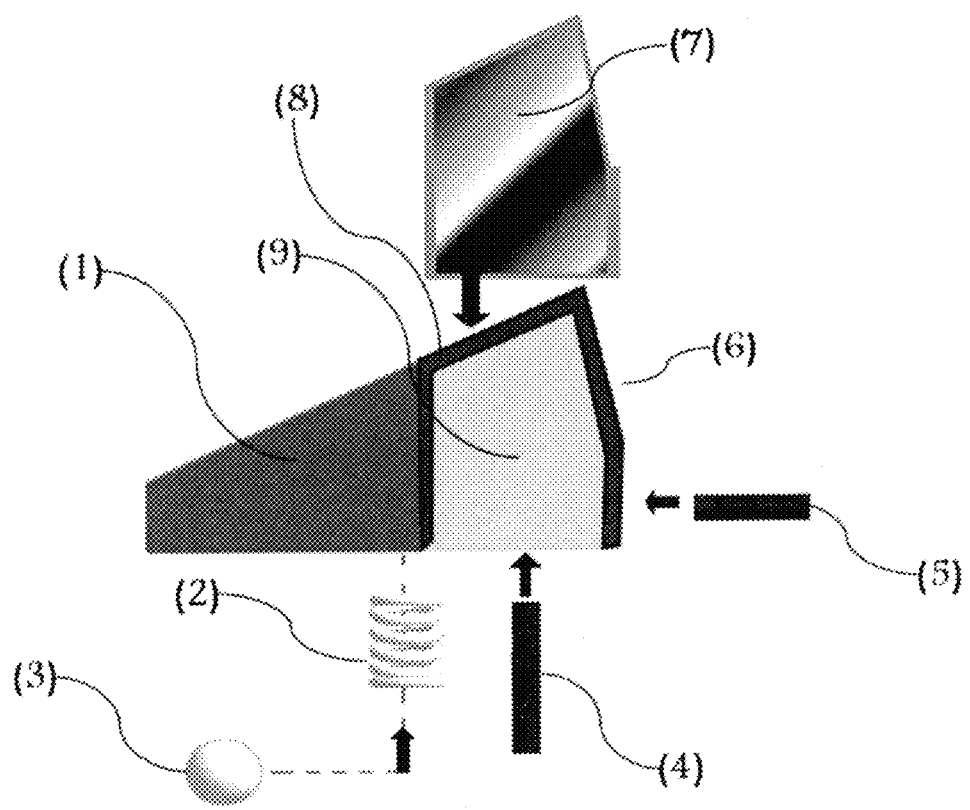
FIG. 1A is an exploded view of a tactical reflectoscope including:
   reflectoscope body
   ball-detent compression spring
   ball
   ball retaining dowel
   rail stop dowel or set-screw (for when a more permanent connection is needed)
      front of 'v' groove
      mirror pocket protective lip
      mirror (1 of 2)
      mirror pocket.
Figure 1B:
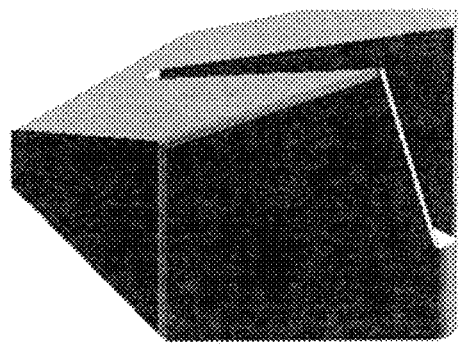
FIG. 1B is a front and right quarter perspective view of a solid metal, plastic, ceramic or other solid material tactical reflectoscope body and an approximately 0.060" deep pocket to hold the mirrors as well as a pocket lip around edge of mirrors formed by said pocket to protect all exposed edges.
Figure 1C:
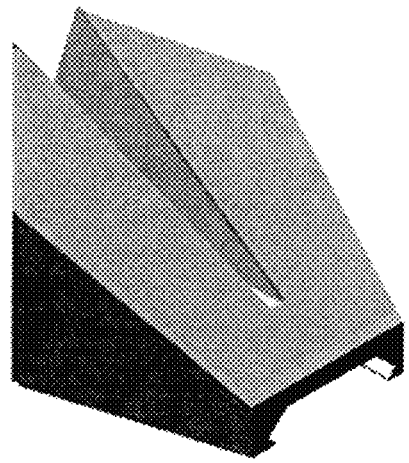
FIG. 1C is a rear left quarter view of a reflectoscope body made of solid metal, plastic, ceramic or other solid material.
Figure 1D:
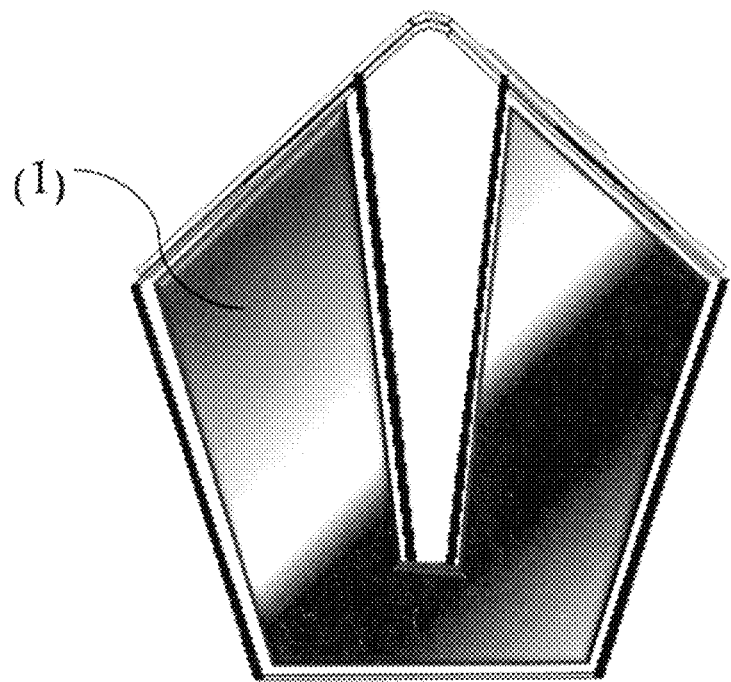
FIG. 1D is a top perspective view of a periscope type, 3rd mirror surface used to see over or under objects, without the ability of the two "front" mirrors which is to be able to use the mirror to take direct action, deliver or shoot. typical use of this top mirror would be from an entrenched position with the gun pointed straight up into the air vertically and allowing the ability to see over an obstacle or out of a trench on a horizontal plane.
Figure 1E:
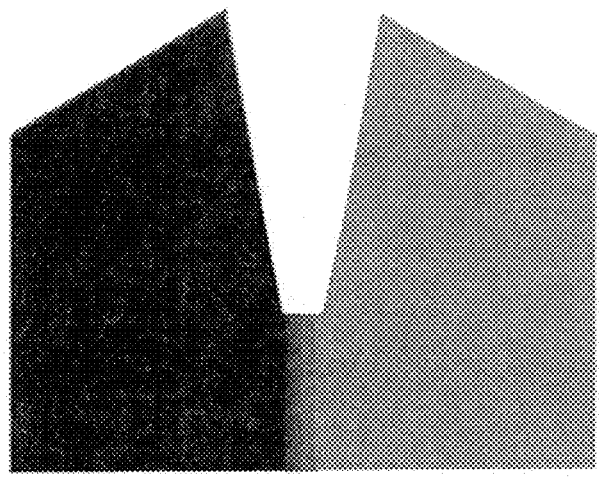
FIG. 1E is a front perspective view of a 90° bent mirror.
Figure 1F:
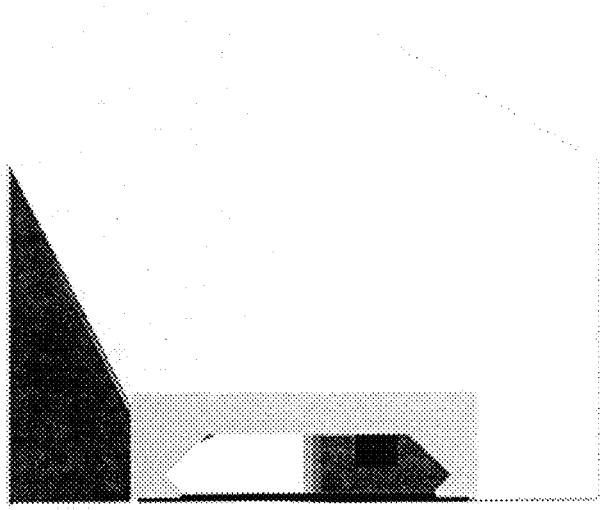
FIG. 1F is a rear elevation view of a tactical reflectoscope body showing the rail acceptance groove as well as the "v" groove.
Figure 1G:
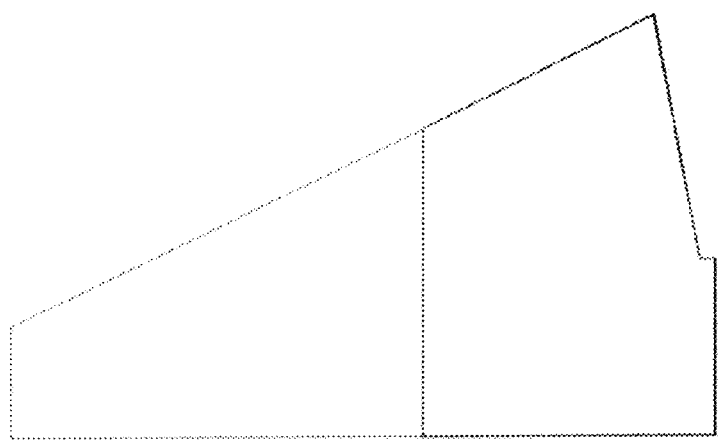
FIG. 1G is a right profile view of a reflectoscope ramp decline angle.
Figure 1H:
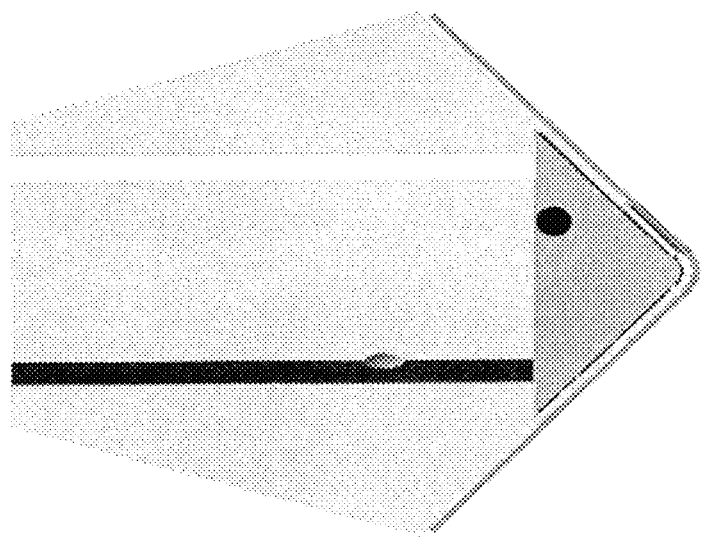
FIG. 1H is a bottom view of a reflectoscope body rail groove.
Figure 1I:
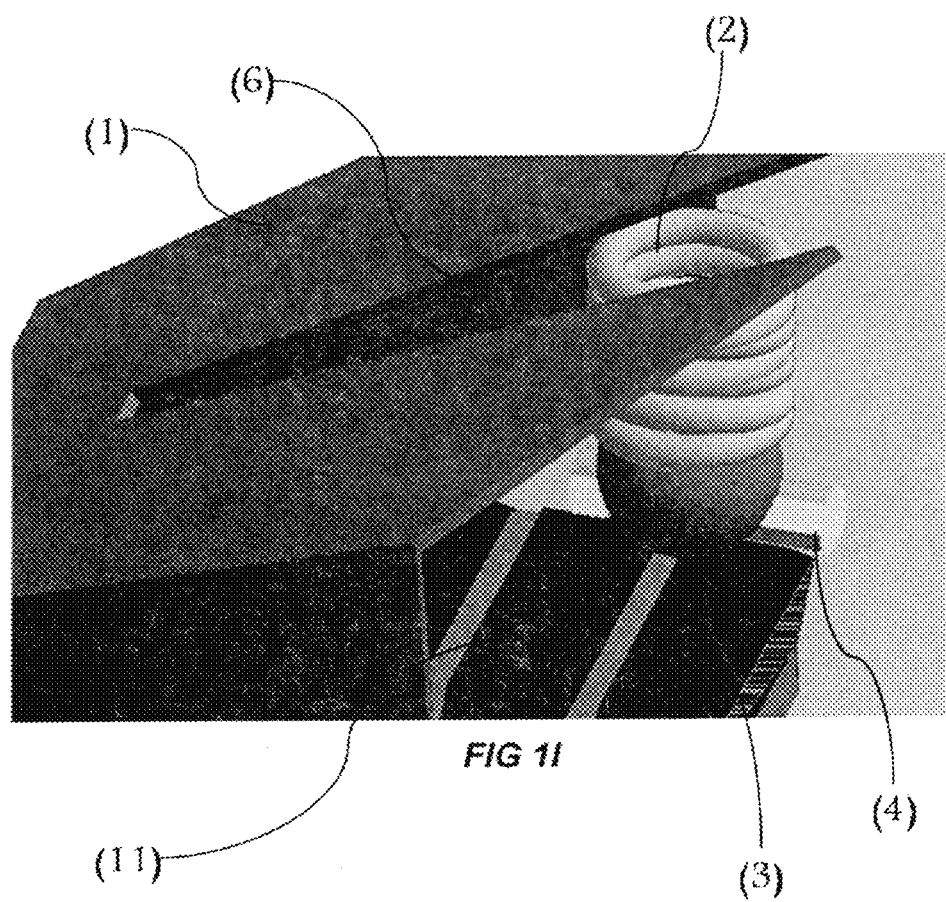
FIG. 1I is a right sectional view of a spring forcing the detent-ball into a picatinny rail cross-groove to connect reflectoscope to host.
Figure 2:
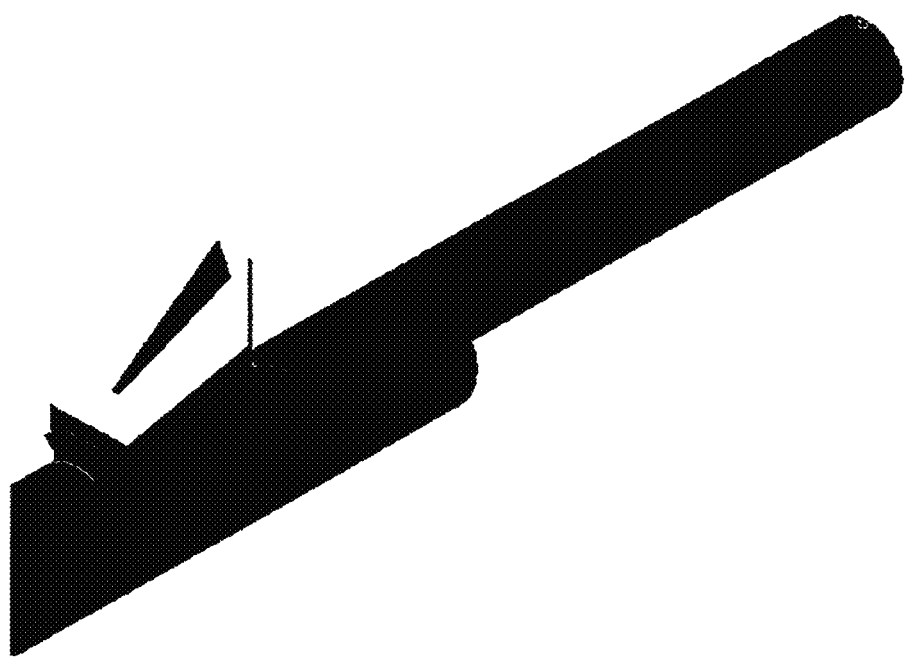
FIG. 2 is a top perspective view of a reflectoscope mounted on a gun directly to a barrel.
Figure 3A:
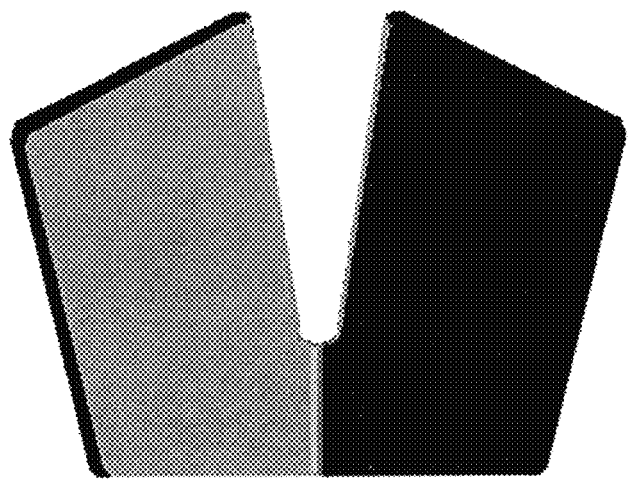
FIG. 3A is a front elevation view of a tactical reflectoscope and the pockets with a perimeter lip to hold and protect the mirrors.
Figure 3B:
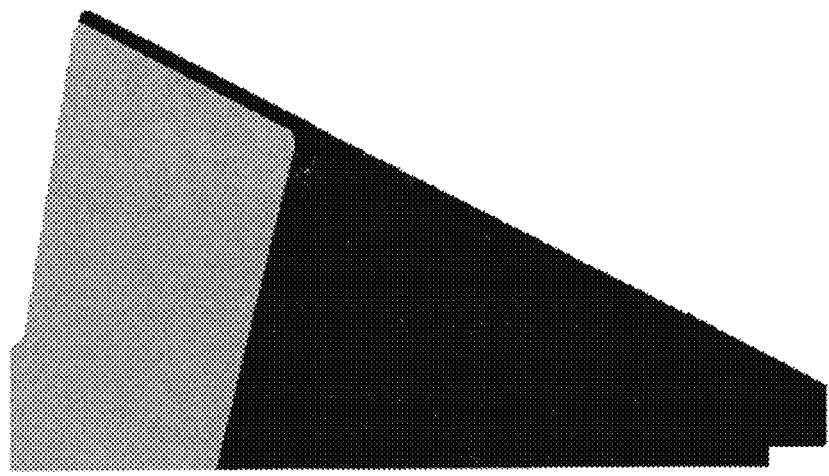
FIG. 3B is a left perspective view of a tactical reflectoscope and protective pocket for the left mirror.
Figure 3C:
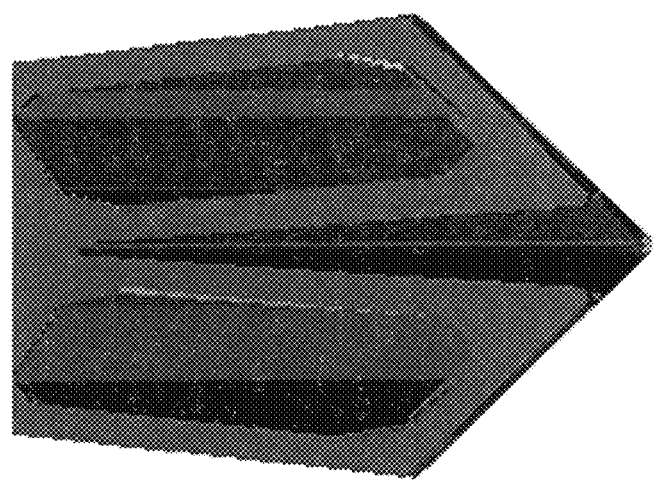
FIG. 3C is a top view of a tactical reflectoscope with hollow-back to illustrate casting and mold injection manufacturing possibilities.
Figure 3D:
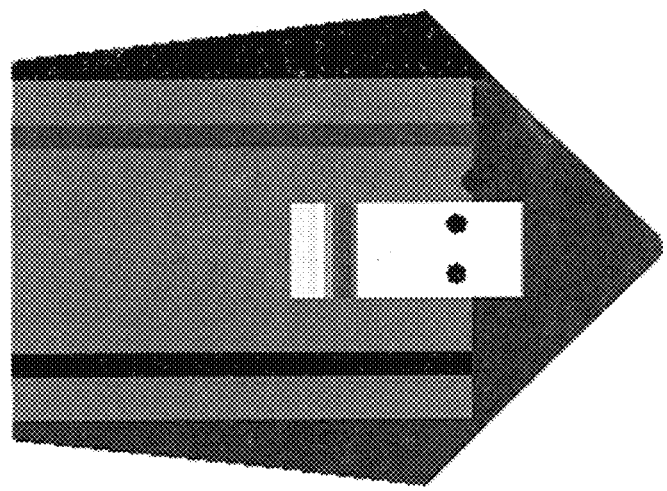
FIG. 3D is a bottom perspective view of a tactical reflectoscope body with tension groove plate connection option.
Figure 3E:
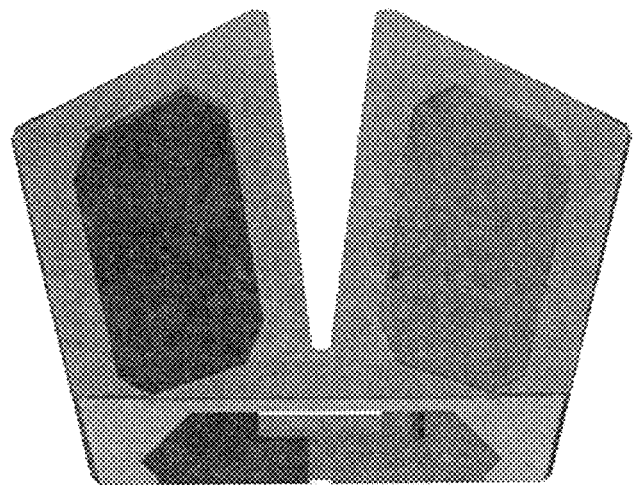
FIG. 3E is a rear elevation view of a tactical reflectoscope with hollow back for casting with tension groove clip connector seen in rail acceptance groove.
Figure 3F:
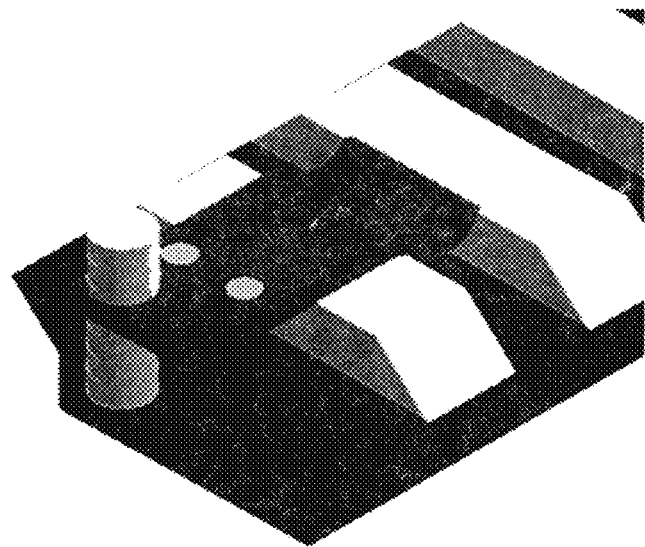
FIG. 3F is a detail view of a tension groove clip connection option and an example of the tension grove clip in use, seating into a rail cross-groove.
Figure 3G:
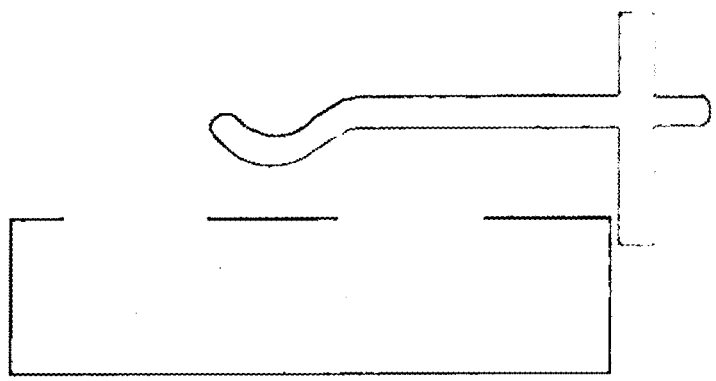
FIG. 3G is a detail view of the profile of the tension groove plate clip's bent section, in action seating into rail groove.
Figure 4:
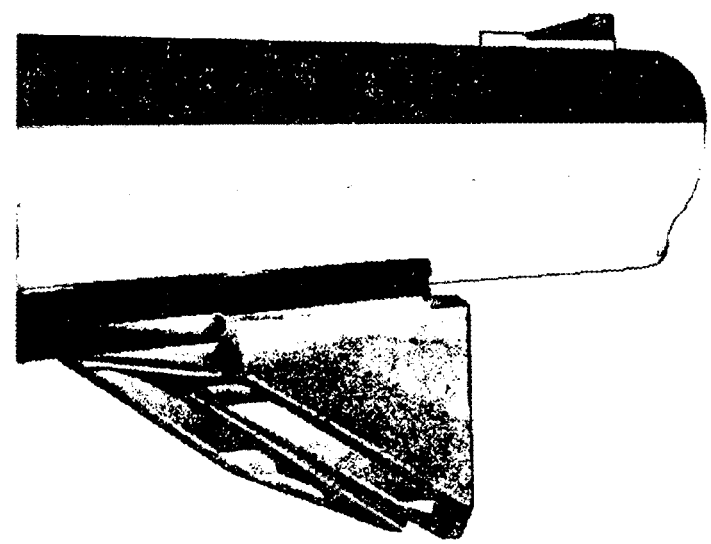
FIG. 4 is a rear quarter view of a tactical reflectoscope mounted under a gun upside down.
Figure 5:
FIG. 5 is a front perspective view of a tactical reflectoscope mounted under a pistol upside down.
Figure 6A:
FIG. 6A is a rear quarter view view of a sheet metal or simple plastic with solid base tactical reflectoscope body.
Figure 6B:
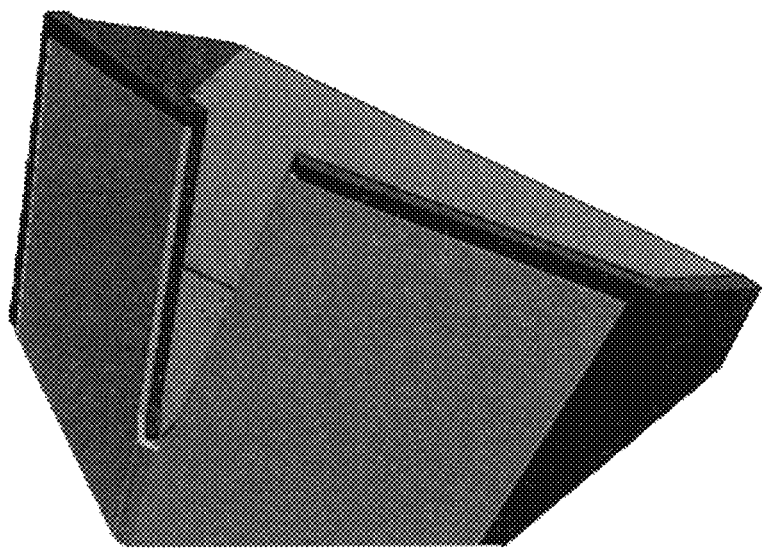
FIG. 6B is a front and left quarter perspective view of a sheet metal or simple plastic with solid base tactical reflectoscope body.
Figure 6C:
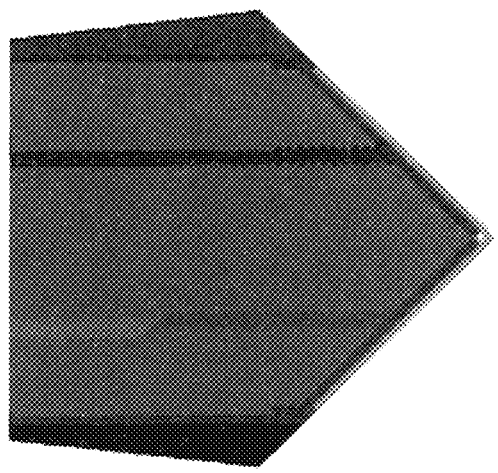
FIG. 6C is a bottom detail view of a sheet metal or simple plastic version of a tactical reflectoscope.
Figure 6D:
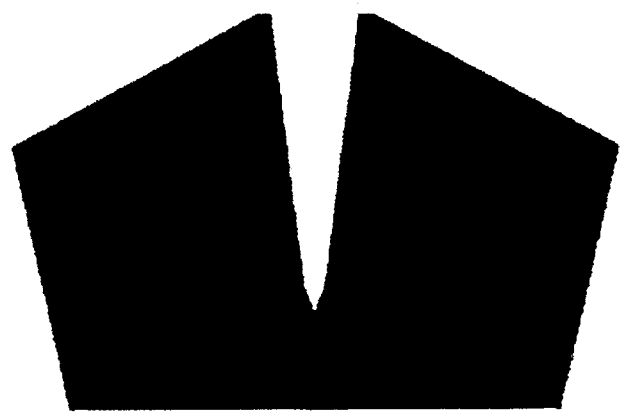
FIG. 6D is a rear elevation view of a sheet metal or simple plastic tactical reflectoscope body.
Figure 7A:
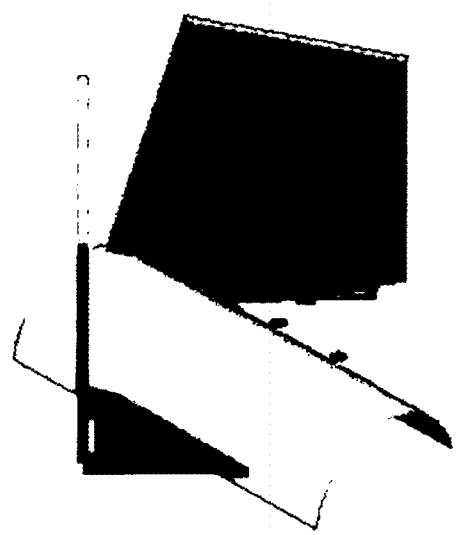
FIG. 7A is a rear left quarter view view of a sheet metal with solid base tactical reflectoscope on a gun.
Figure 7B:
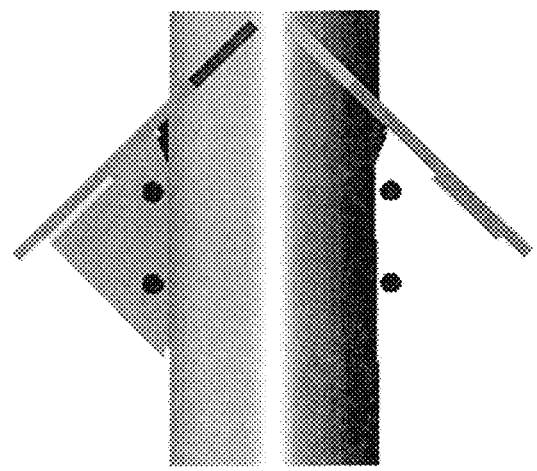
FIG. 7B is a top elevation view of a sheet metal or simple plastic and solid base tactical reflectoscope body on a gun barrel.
Figure 7C:
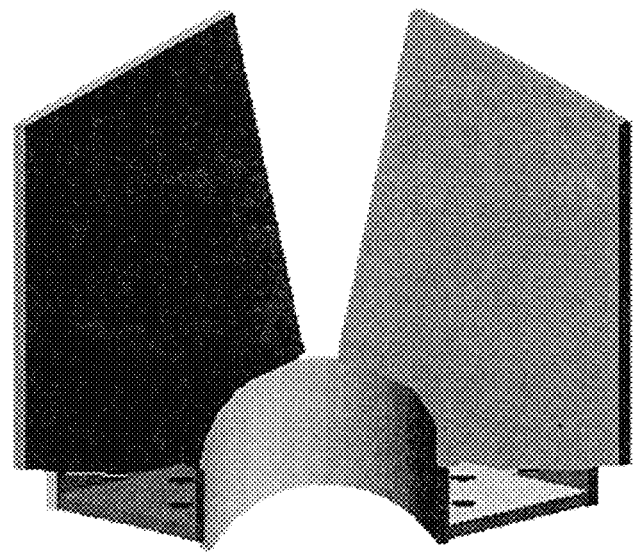
FIG. 7C is a rear perspective view of a sheet metal or simple plastic and solid base tactical reflectoscope with connecting groove for a gun barrel.
Figure 8:
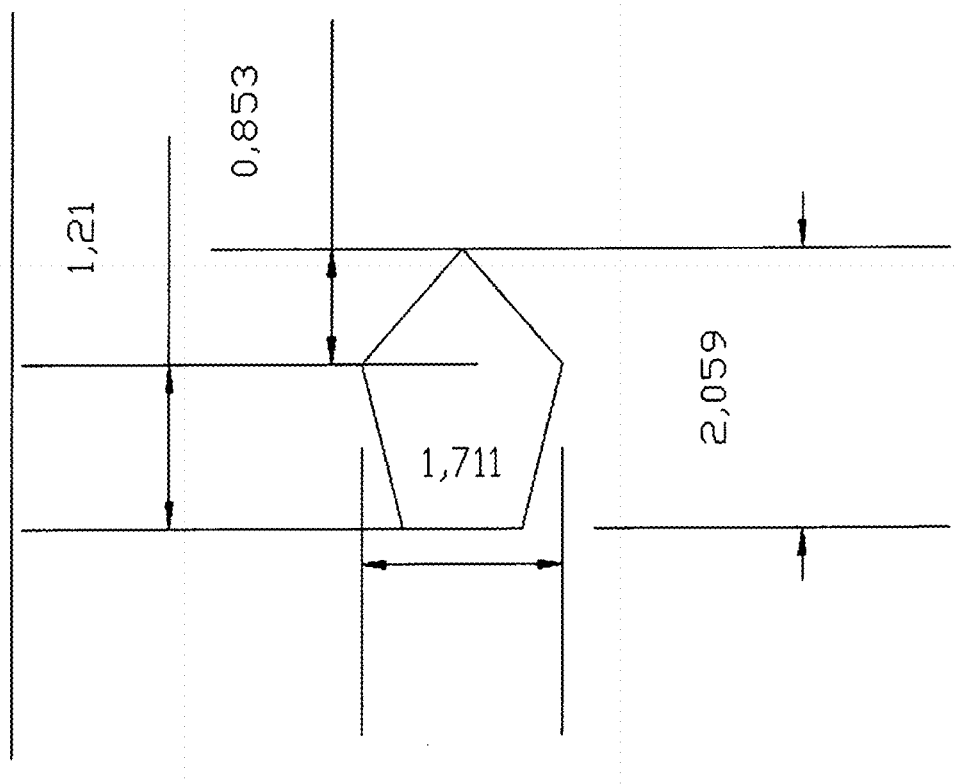
FIG. 8 is a top perspective view of a tactical reflectoscope lateral perimeter or profile and the detail of typical size potential.
Figure 9:
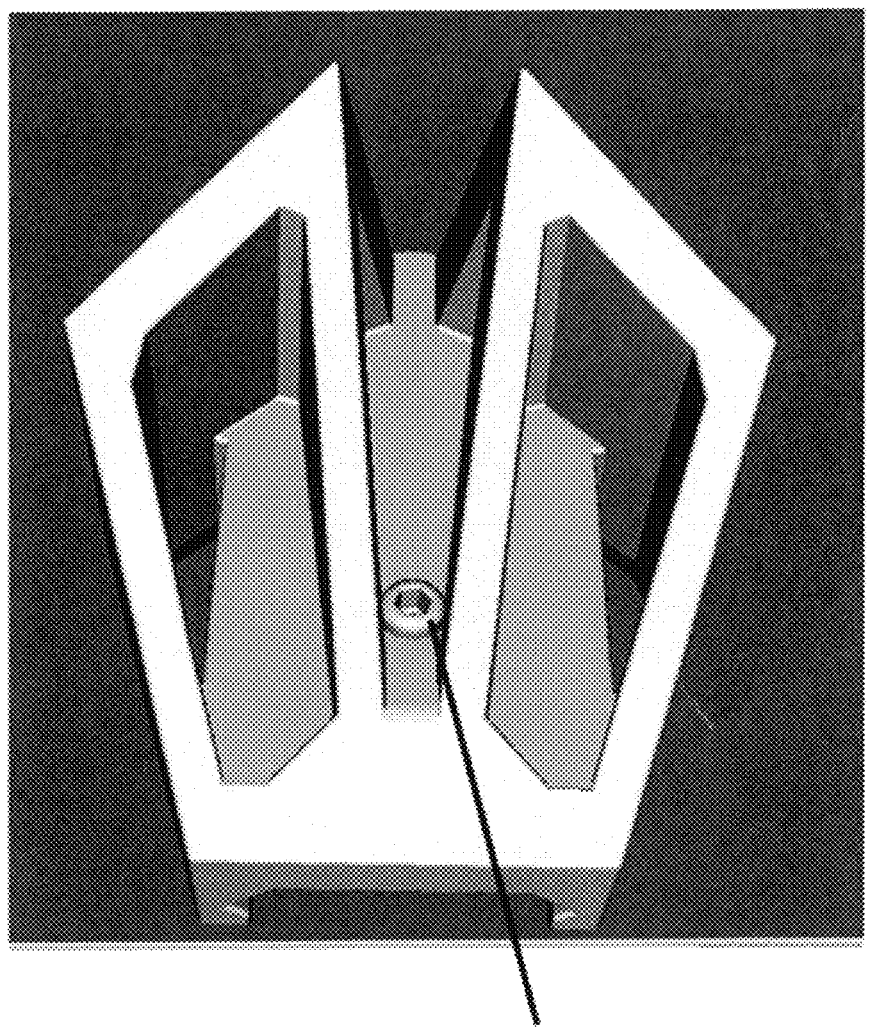
FIG. 9 is a rear perspective view of a set-screw holding a tactical reflectoscope, hollow back version, showing the top of the set-screw placement for connecting to a firearm picatinny or weaver rail.
Figure 10:
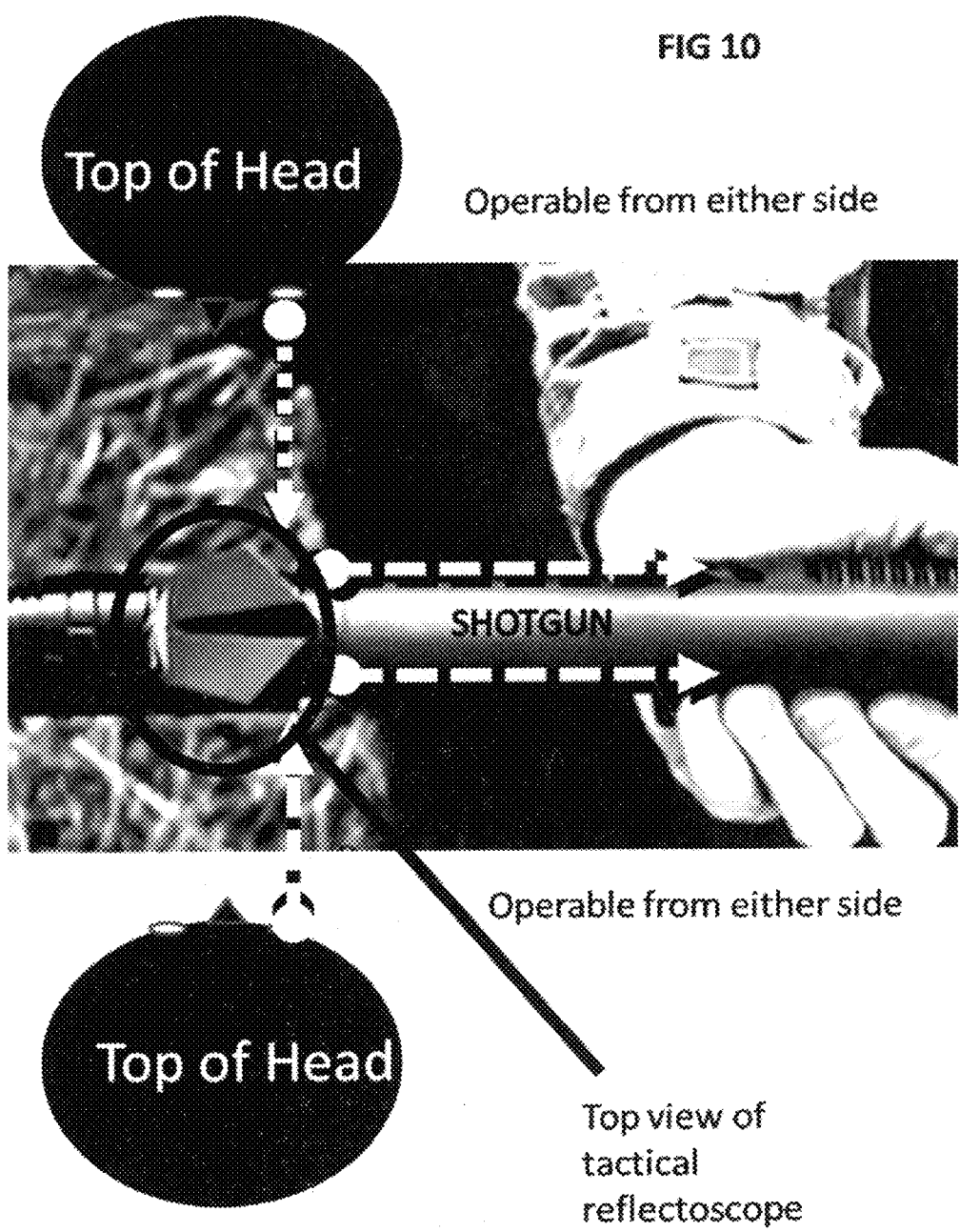
FIG. 10 is a top perspective view of a tactical reflectoscope being used on a shotgun demonstrating the ability of the reflectoscope to be used from either side by showing two heads facing the reflectoscope from both sides.
Figure 11:
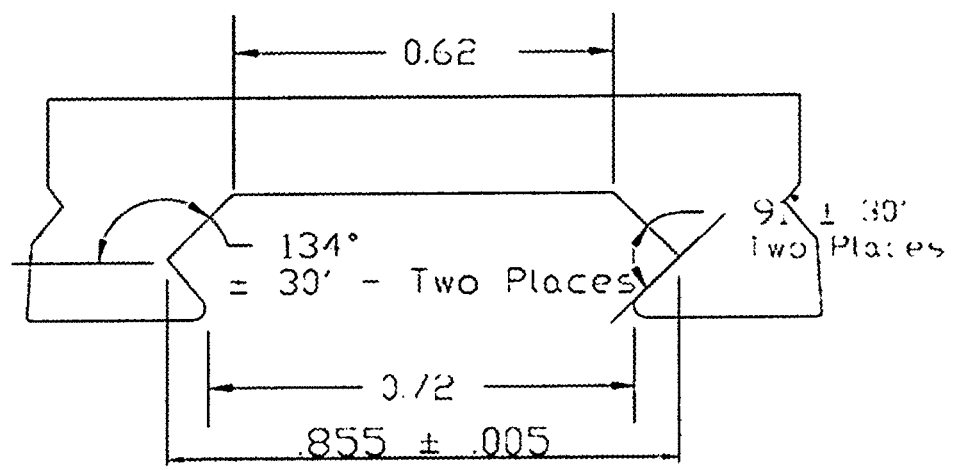
FIG. 11 is a rear elevation view of a rail accepting groove made to accept a picatinny or weaver rail and the dimensions and shows how the void is formed in order to connect the reflectoscope to the rail by wrapping around and under a picatinny or weaver rail.
Figure 12:
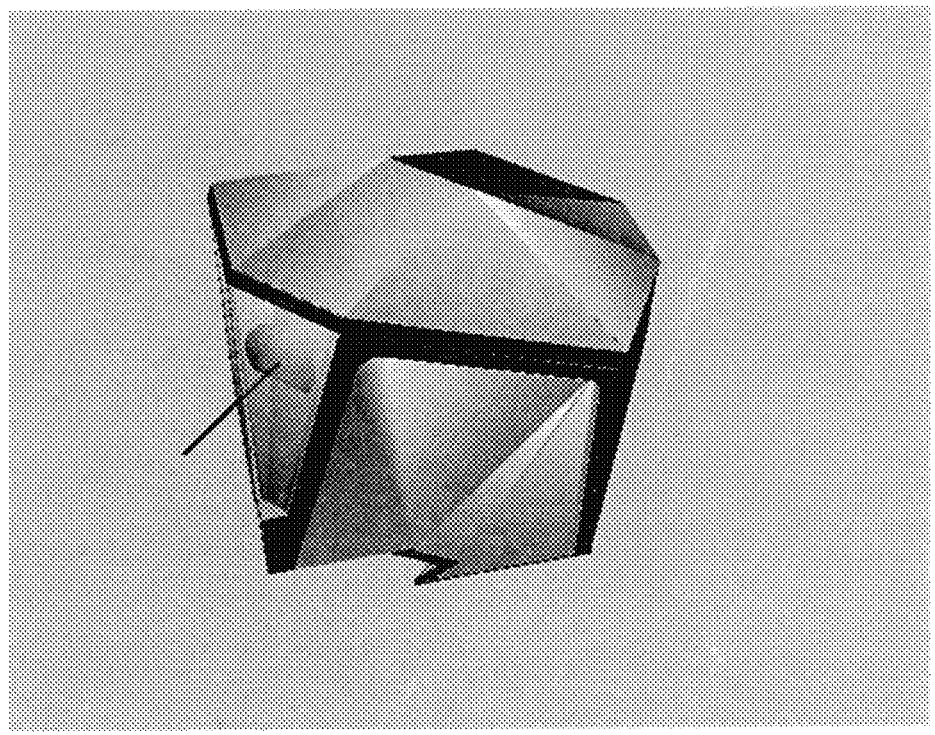
FIG. 12 is a top perspective view of a laser and or flashlight module made specifically for use on the tactical reflectoscope, installed into the "v" groove in the top of reflectoscope.
Figure 13:
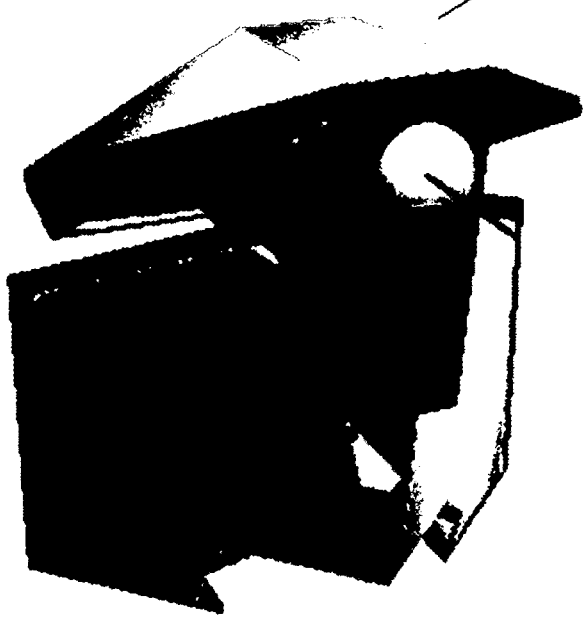
FIG. 13 is a front perspective view of a laser and or flashlight module off of the tactical reflectoscope.
Figure 14:
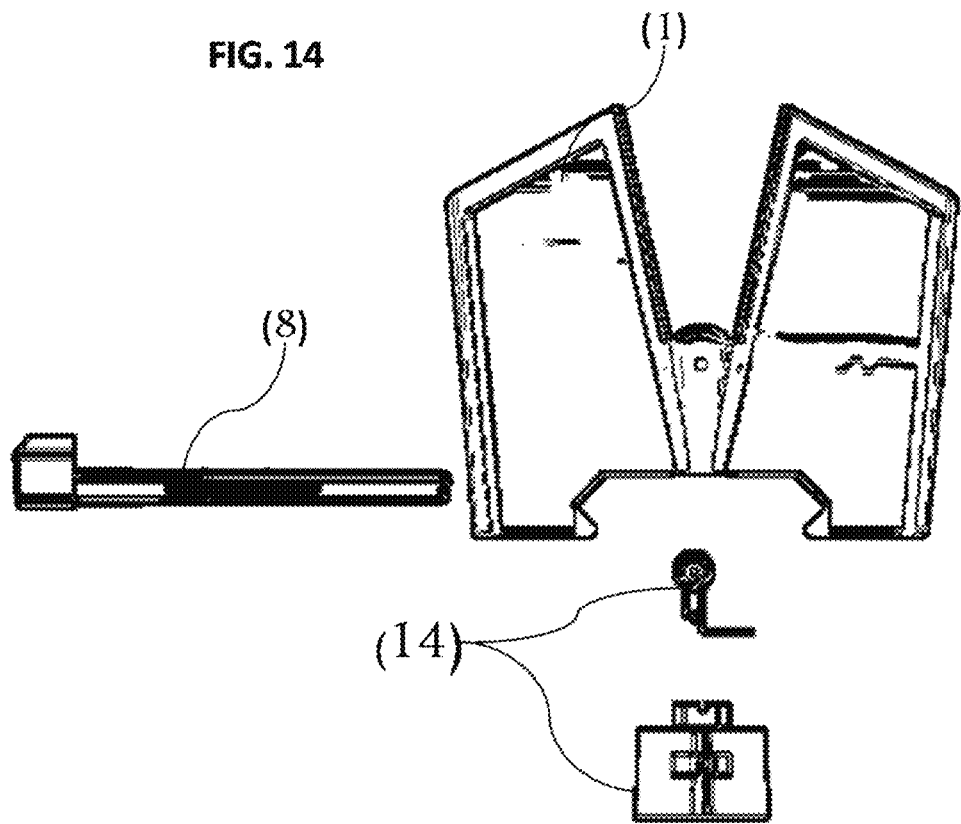
FIG. 14 is a front elevation view of a tactical reflectoscope with the cross bar side tension connection arm for reflectoscope connection removed from the side as well as the low profile laser module and switch removed from the reflectoscope.
Figure 15:
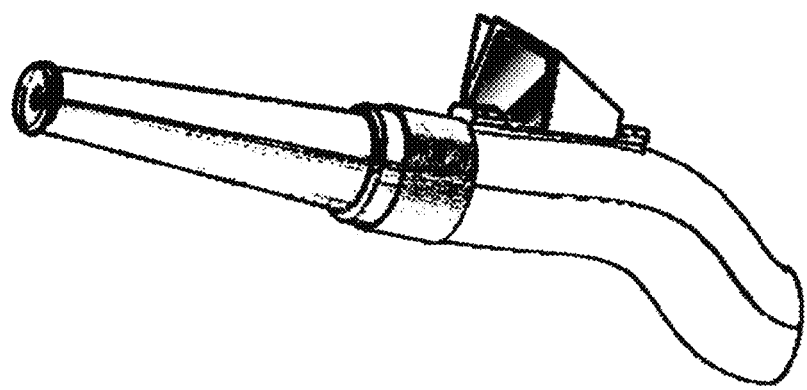
FIG. 15 is a left perspective view of a reflectoscope on a fire hose.
Figure 16:
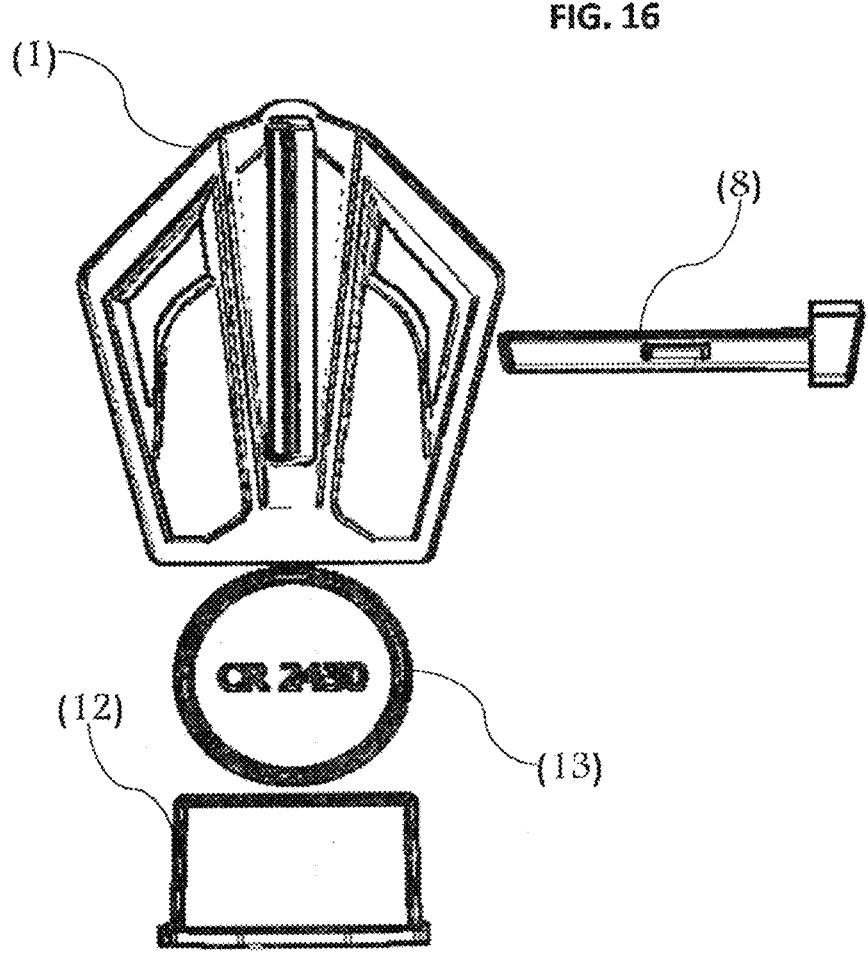
FIG. 16 is a top perspective view of a reflectoscope body, laser and or flashlight module battery holder which serves as an on and off switch,
   cr 2430 battery, cross bar side tension connection arm.
Figure 17:
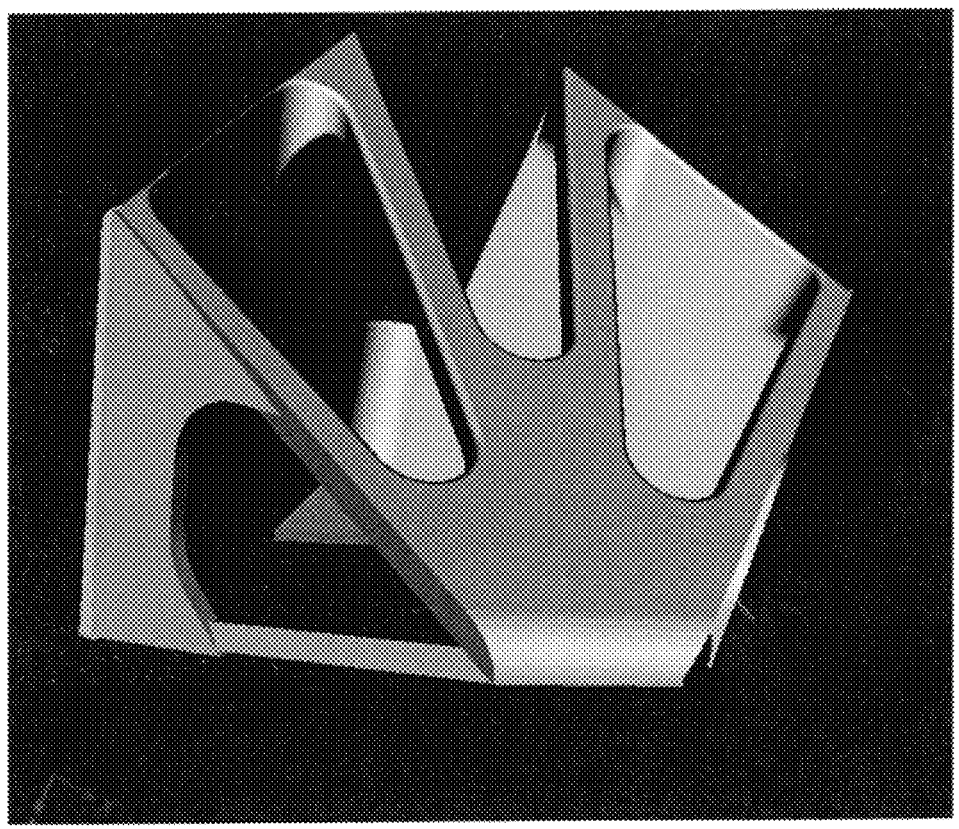
FIG. 17 is a rear perspective view of a tactical reflectoscope cover made of rubber or other material to protect mirrors and reflectoscope body as well as keep mirrors from reflecting and revealing soldier location while reflectoscope is in the field but not being used.
Figure 18:
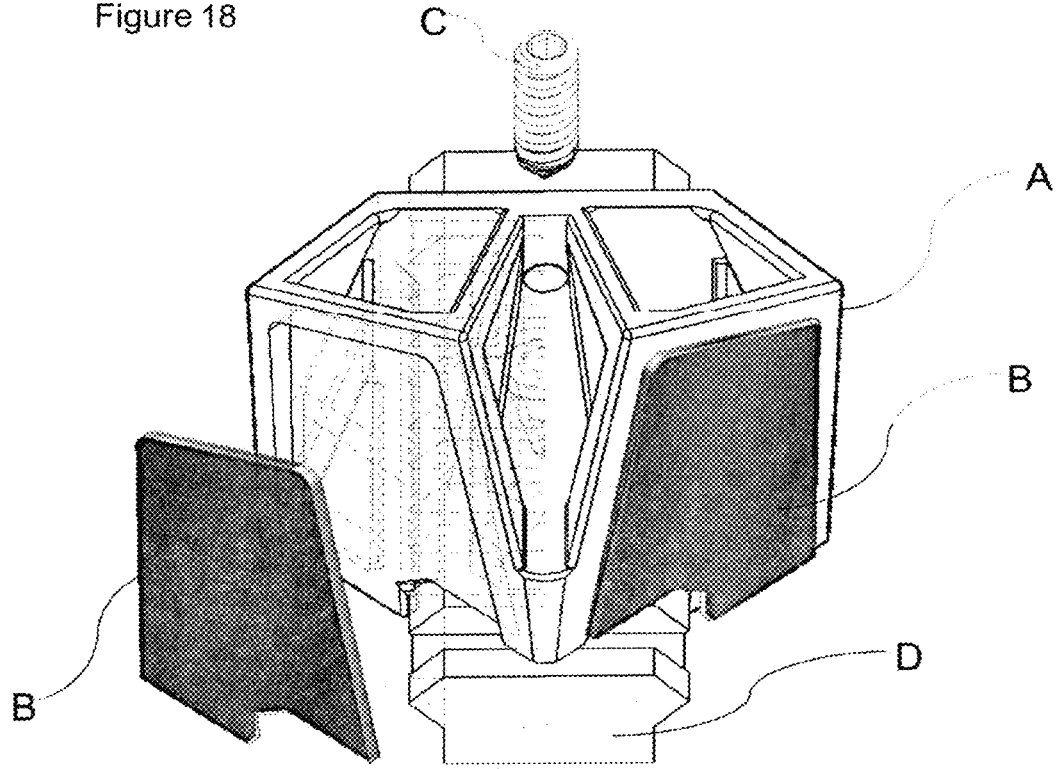
FIG. 18 A 3-Dimensional view of the Tactical Reflectoscope
Figure 19:
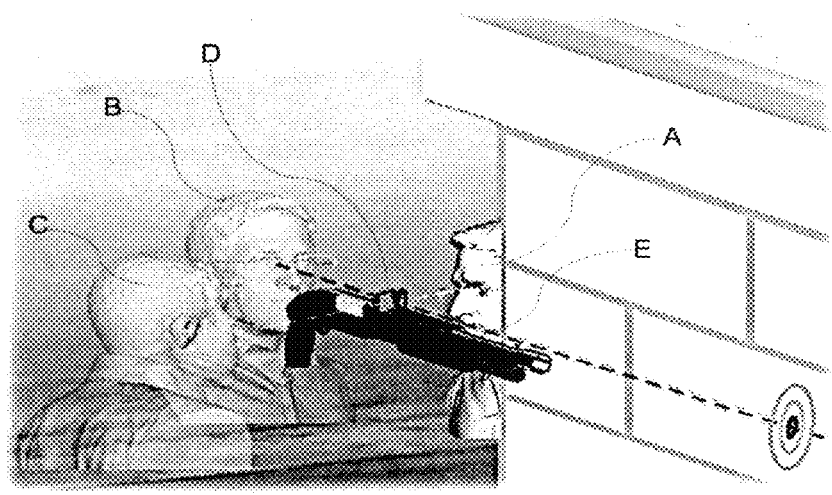
FIG. 19 Side View of Tactical Reflectoscope in Use
Figure 20:
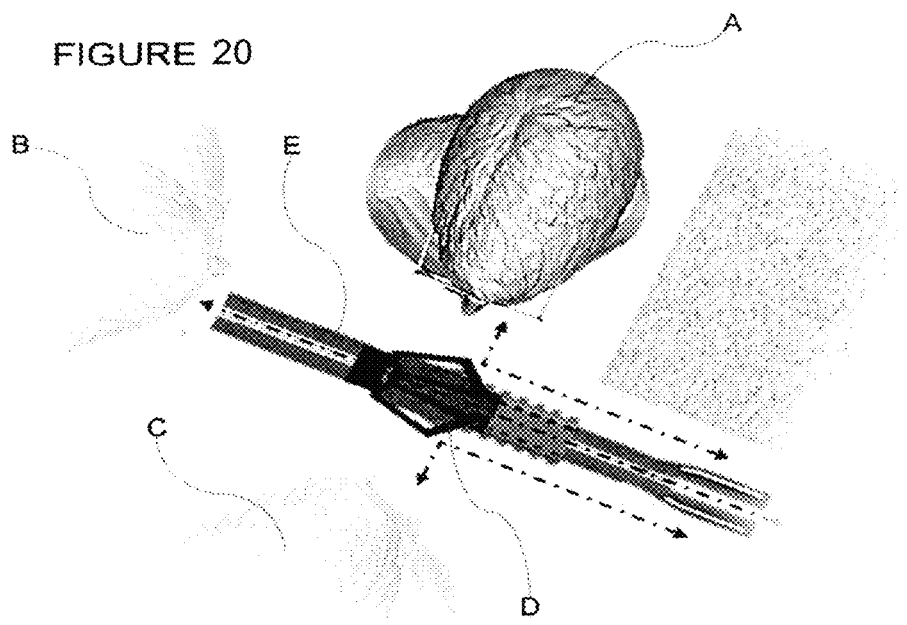
FIG. 20 Top View of Tactical Reflectoscope in Use.

The tactical reflectoscope 36 body in it's optimal construction and build may be in one possible form, constructed in a shape resembling a nearly symmetrical, but slightly long, front to rear, pentagon on its lateral perimeter (when viewed from above) and can be milled by manual mill or CNC as well as cast or inject molded in metal, plastic, ceramic or any other resilient material, also bent sheet metal or simple form plastic possibility is also a viable solution as the primary function of the device is not ultimately determined by or subject to the body or chassis build per se, but the holding and placement of the mirrors 7 on a gun or other host and the physical location in relation to the firearm or host is paramount.

The primary useful element and aspect of this invention is what is attached to the described body. In one form, vertically situated mirrors 7, including a single mirror, bent through it's center vertical line to 90° forming a "V" with the reflective side of the mirror facing outward of said bent 'V' or; two vertically placed mirrors 7, set at 90° relative to each other, meeting at their vertical edge in the form of a "V" being flat or concave or convex or, the described body or host can be made of, but not limited to, metal/plastic form or block and polished or processed to reflect as a mirror with the same functional attributes as would be achieved by attaching mirrors 7 or reflective surfaces vertically to the host, intersecting where the 90° bend or point is situated, which is vertically in the center, as in the previous description of a single bent mirror or at the meeting point of the two mirrors 7 or the line where the reflective surfaces formed by the body of the apparatus vertically, are joined forming a 'V' as well as a top periscope type mirror 26.

The "V" shape formed by one bent or two reflective surfaces or mirrors 7 arranged at 90° to each other (45° between the aim or projectiles path or line of sight between the target and the user), forward facing, vertical, side reflecting planes of the reflectoscope are the primary functional elements of this invention. The ability to use two opposing, static surfaces from either of side of a firearm or pointing, acquisition, gathering or delivery device or used on a fire hose as with the fire hose version of reflectoscope 18 is a major element in what makes this apparatus unique. The third mirrored surface, top periscope type mirror 26, which is situated on the top of the device is also a differentiation especially when combined with the functionality of the forward facing reflective surfaces or mirrors 7.

The tactical reflectoscope 36 allows viewing, sighting, firing, pointing, action and attack from around corners and at or from an unusual or unorthodox, 90° position from either side of the weapon or apparatus to which it is attached, allowing the user to minimize detection, danger, heat and exposure or to view or take action from what would otherwise be an impossible, dangerous or uncomfortable vantage point.

The tactical reflectoscope 36 cover made from rubber or any resilient material that conforms to the shape of the reflectoscope, provides protection for the mirrors 7 and body of the reflectoscope and also eliminates reflections and glare to prevent revealing a soldiers or users position.

An optional forearm handle and hand/wrist cover provides additional protection to the hands and arms of the user, which is the only part of the users body that has to be exposed when utilizing the reflectoscope except for the use of the top or 3rd mirror element.

The position of the lateral 90° reflective surfaces with the apex of the 'V'-shape, formed by the mirrors 7 (when viewed from above) are aligned to but do not cross the center-line of the barrel, tube, nozzle or desired target direction of the primary apparatus, camera, pointing device, spotting scope or delivery or acquisition system, allowing function from either side of the host to which the reflectoscope is attached, by longitude to 45° in relation to a 90° line crossing the gun or in 45° placement in relation to the butt-stock or flat end of the gun barrel making a perpendicular, horizontal line.

The flat rear end of the reflectoscope body 1 is square and parallel with the butt-stock or the receiver and stock partition line where they come together, or flat front of a gun barrel (when used with a gun) or perpendicular line in relation to the longitude of a typical firearm.

Directly facing one of the single sides of one of the primary lateral reflective vertical flat planes or one of the single side mirrors 7; a non-symmetrical 5 sided shape is observed due to the "V" groove 6 void that may be cut into the body of the reflectoscope for an unobstructed sight line view. If the optional "V" groove 6 void is not formed or cut into the reflectoscope, a 4 sided asymmetrical mirror or reflective surface is observed. The metal, plastic or other media block or functional form that acts as the host or body is cut or formed with properly shaped voids to separate the reflective plane or reflective areas of the unit and resemble a valley through the center of the body in a "V" groove 6 shape parallel in longitude to the barrel or primary apparatus' center-line of sight, allowing the user to see through the reflectoscope to a guns' factory installed or aftermarket iron sights and bead or to allow the light from a laser or flashlight mounted behind to pass through or to see light or the view through the unit from a red-dot scope or sighting/magnification or hunting type scope to pass without unreasonable obstruction. This can also be used to simply see where the gun or device to which the reflectoscope is attached is aimed.

The previously described "V" groove 6 void that is cut through the top of the reflectoscope in a "V" valley configuration, allows for optional laser and or flashlight module 20 and other modules to be installed and fit flush into the body made specifically for this reflectoscope body 1.

The body or host in one form of this reflectoscope body 1 is solid, made from extruded aluminum or any metal or plastic or organic or synthetic material known or unknown. The body of the reflectoscope may also be milled, cast, formed, carved or made in other ways including but not limited to laser and water cutting and pressure broaching as well as others. The reflectoscope may also be made from separate parts and glued, welded, pressed, attached, screwed together or by other means. The reflectoscope aesthetic is meant to be similar to a stealth airplane, fighter or ship, utilizing proven shapes that are known to help in avoiding detection.

The body of the reflectoscope is formed, milled, extruded or made forming a rail accepting groove 28 that will slide onto and accept a picatinny or weaver rail that enters from the rear of the reflectoscope in the version that the mirrors 7 extend to the bottom of the body or host form or from either the front (under the mirrors 7) or rear, in the version that allows for placement anywhere on the picatinny or weaver rail.

When the reflectoscope is installed on a picatinny or weaver or other similar rail system, within the rail accepting groove 28, the connection or attachment of the reflectoscope to a weaver or Picatinny rail 11 is accomplished by using the cross-grooves in either the picatinny, or weaver rail as receivers for a steel or plastic or other material forming a detent ball 3 installed into the underside of the reflectoscope above the rails notches with spring 2 pressure behind it, so as to descend or push down on the detent ball 3 into the notch, keeping the reflectoscope from moving on the rail while in use, while firing, in transport inside of a case, pocket, holster, bag on a strap or the like, until it is forced out of or into position by hand. The spring 2 loaded detent ball 3 system is unique to this tactical reflectoscope 36 and an integral aspect to the uniqueness offered using this reflectoscope and opens the possibilities of using such a system for any other connected accessories related or which may be made. This detent ball 3 attachment is an improvement on and beyond any form, clamp or device used to connect a gun accessory found to be in use today and useful for any accessories that can be attached to picatinny or weaver rails. It is quick and simple to slip the reflectoscope off and on the rail and has enough friction to hold it in place during use, until removed intentionally by hand. A ball retaining dowel 4 pin is placed strategically in a horizontal position under the detent ball 3 as a stop below and to one side of the detent ball 3 to keep the detent ball 3 from coming out of the reflectoscope while not on a rail. The spring 2 provides friction and pressure to force the detent ball 3 into the rail cross-grooves for seating.

The tactical reflectoscope 36 can be a semi-permanently installed accessory requiring no adjustments or target zeroing and requiring simple or few tools to install or remove and also has the option to be installed in a more permanent fashion directly to the receiver or top, side, bottom or any position of any gun or apparatus. The provision for a connection to a picatinny or weaver rail system is not limited to, but in addition to the provision for connection with assistance of an integrated detent ball 3, side tension connecting bar 16, tension groove plate 30, crew, set-screw 10, magnet, hose-clamp or spring 2 plunger attachment, glue, double sided tape and the like and/or as well as, drilled with holes and/or tapped to attach to a guns receiver directly and a provision for an optional attachment clamp or ring for devices that do not have a native means of attachment is also provided as well as others.

Another variation of the tactical reflectoscope 36 uses an integrated side tension connecting bar 16 or cross-bar connection that is used to hold the tactical reflectoscope 36 on to a Picatinny or Weaver rail when the reflectoscope is slid onto the rail and is positioned so that the voids in the sides of this version of reflectoscope is lined up with the notch on a rail and the side tension connecting bar 16 is slid through the reflectoscope and notch on the rail and the tension of the cross-bar clicks into place until the end of the bar is manipulated out of place through an access void located on the opposite side that the side tension connecting bar 16 was placed into.

The reflectoscope's host/body is formed with the main, forward facing reflective vertical plane being the highest as well as the widest aspect of the apparatus, slanting down at a approximately 28.5° from horizontal (when viewed from the side) with the angle descending toward the rear of the body, as illustrated, like a ramp, toward the gun or attached apparatus'. The rear quarter planes or sides taper toward the rear of the body (looking down from above) at approximately 11° toward the middle line ending at the rear of the reflectoscope but leaving enough material to allow for a solid and ample connection to the rail system on both of the sides of the rail groove.

In its typical intended use, the reflectoscope's top-facing, rear ramp plane would be facing up from the top the gun or apparatus and would also allow for a top periscope type mirror 26 or polished surface to be used in the same fashion as the reflectoscope's main mirrored forward facing surfaces but without the ability to fire at, acquire or deliver to the perceived target while holding the gun or connected apparatus, due to the fact that it would be, for example, pointed straight up toward the sky vertically but would allow the user to able to see on a horizontal plane from cover.

The approximately 28.5 degree slant ramp on the top of the reflectoscope also allows room for close placement of additional accessories affixed on the rail and behind the unit. The resulting reflection and image conveyed by the forward facing sides of the reflectoscope to the user/shooter is an image of what is in front of the gun or delivery/acquisition apparatus to which it is connected, allowing the user to remain in, or securing a position that places the user/shooter 90° to the side of the gun behind cover or concealment.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A tactical reflectoscope mirror sight attachment for firearms, comprising a casing portion adapted to detachably engage the accessory rail of the firearm; and two mirrors within said casing portion arranged at 45° in planes parallel to, but outside of, the firearms usual line of sight and at an angle of approximately 45° thereto; said mirrors being on opposite sides of a V-shaped groove in the casing portion and immovably affixed to said casing portion in the position to enable the shooter to align the firearms sights and discharge from either side of the firearm by direct reflection, wherein said casing portion via the V-shaped groove holds and positions the mirrors outside of the usual line of sight of the firearm allowing a passthrough of vision through the V-shaped groove and therefore the utilization of the front and rear sights as well as a telescopic scope, red-dot scope, flashlight etc. without obstruction of the line of sight of the firearm, even if the invention is between the front and rear sights or the shooting person and the target.

2. A tactical reflectoscope mirror sight attachment for aim-able devices, comprising a casing portion adapted to detachably engage an aim-able device; and two mirrors within said casing portion and arranged at 45° in planes parallel to, but outside of, the amiable device's usual line of sight, and at an angle of approximately 45° thereto; said mirrors being on opposite sides of a V-shaped groove within the casing portion and immovably affixed to said casing portion in the position to enable the user to align the amiable devices' usual direction of engagement and discharge from either side of the aim-able device by direct reflection, wherein the top side of the casing is an inclined surface.

* * * * *